Aug. 17, 1943.  J. J. OSPLACK  2,326,795
METHOD AND APPARATUS FOR DRESSING INVOLUTE
GRINDING WHEEL PROFILES
Filed Sept. 28, 1940   3 Sheets-Sheet 1
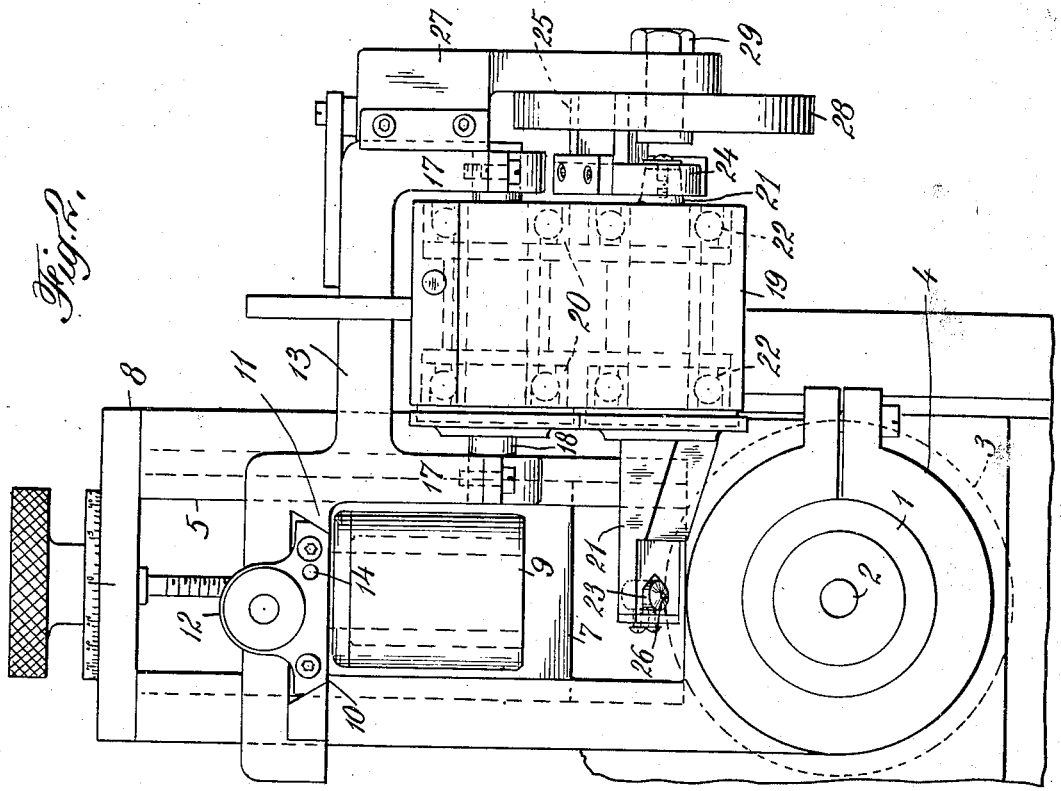
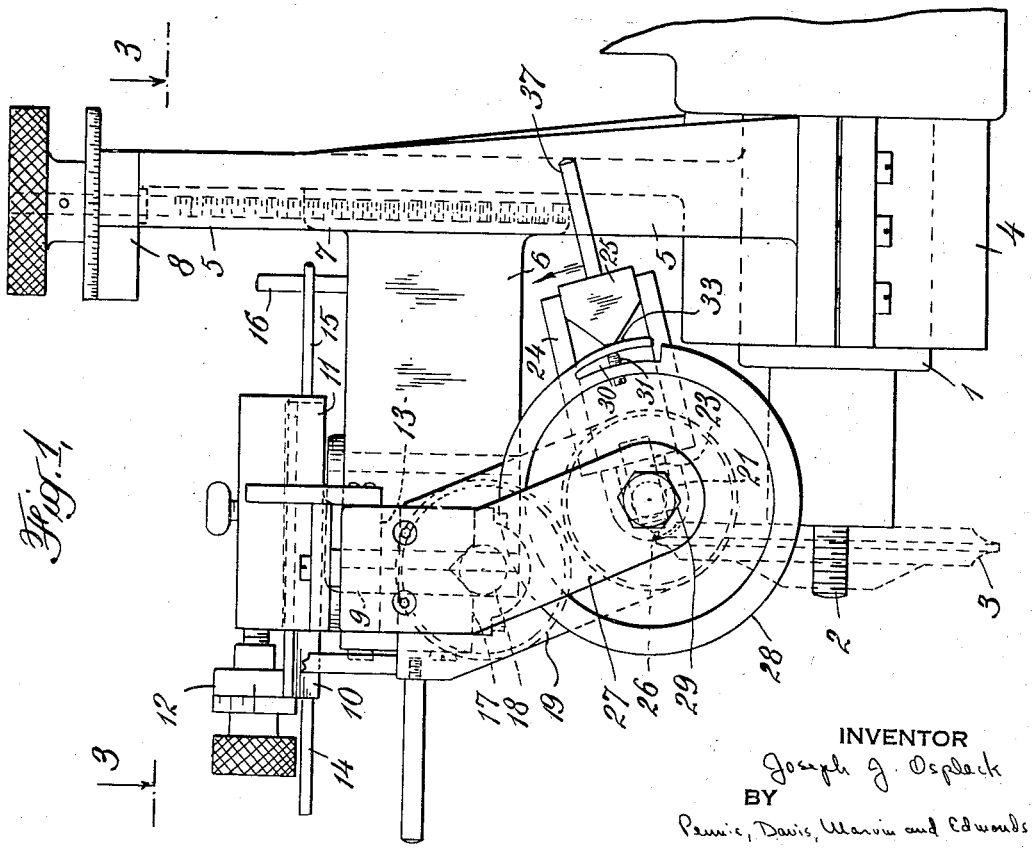
INVENTOR
Joseph J. Osplack
BY
Pennie, Davis, Marvin and Edwards
his ATTORNEYS Aug. 17, 1943.   J. J. OSPLACK   2,326,795
METHOD AND APPARATUS FOR DRESSING INVOLUTE
GRINDING WHEEL PROFILES
Filed Sept. 28, 1940   3 Sheets-Sheet 2
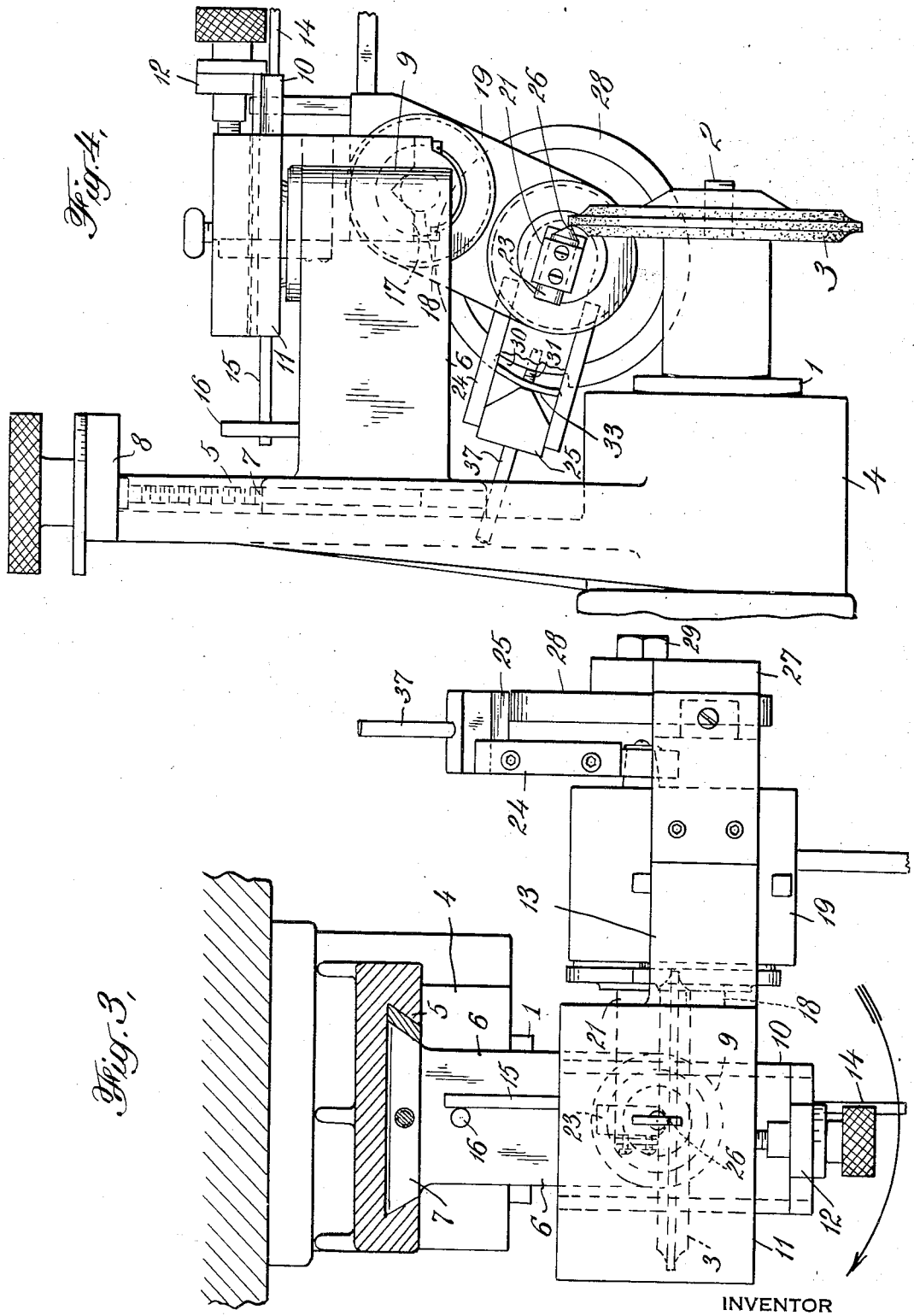
INVENTOR
Joseph J. Osplack
BY
Pennie, Davis, Marvin and Edmonds
his ATTORNEYS

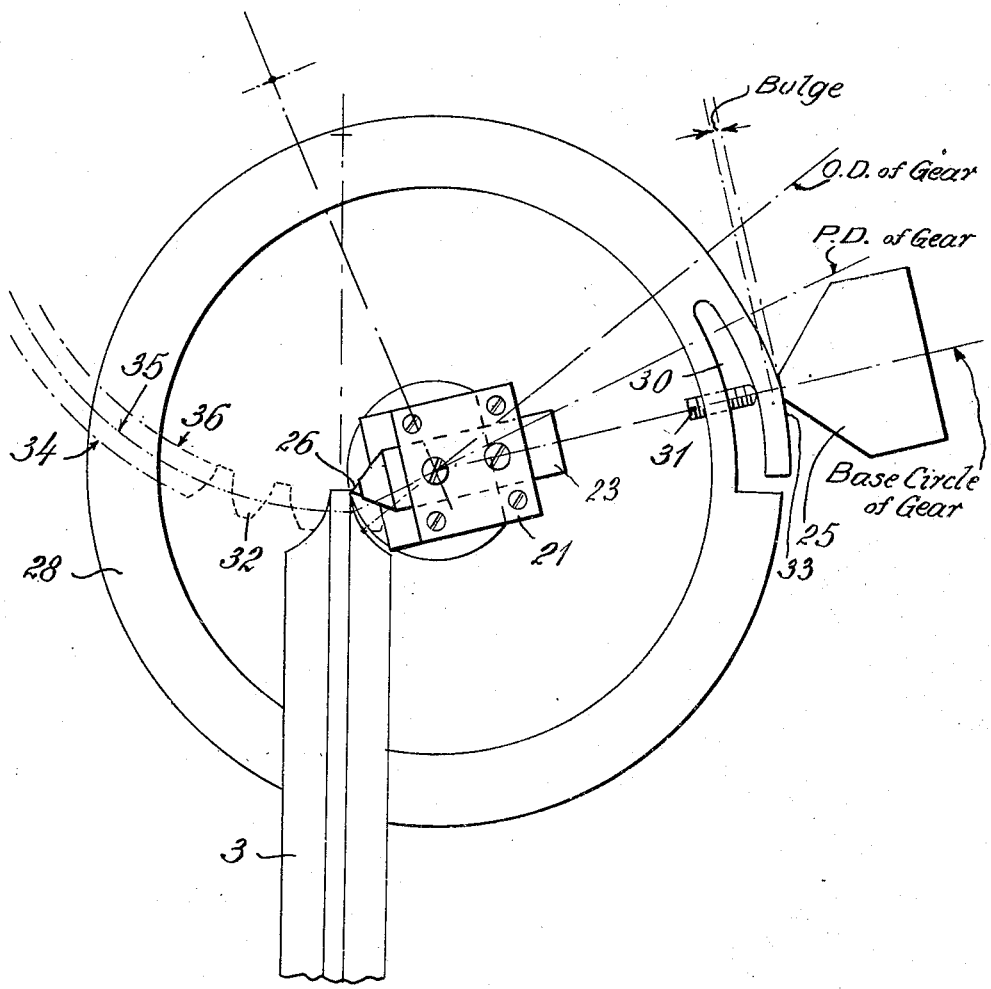

Patented Aug. 17, 1943

2,326,795

UNITED STATES PATENT OFFICE 2,326,795

METHOD AND APPARATUS FOR DRESSING INVOLUTE GRINDING WHEEL PROFILES

Joseph J. Osplack, Detroit, Mich., assignor to Vinco Corporation, Detroit, Mich., a corporation of Michigan Application September 28, 1940, Serial No. 358,920

7 Claims. (Cl. 125—11)

This invention relates to dressers for abrasive wheels and particularly to a tool adapted to dress involute profiles on the cutting faces of wheels employed in gear grinding.

The object of my invention is to provide a tool which will accurately dress the cutting faces of a gear grinding wheel to a profile which will produce gear teeth having involute form, but which will not require the use of special templates or jigs for each different profile it is desired to cut. Stated in another way, the object of my invention is to produce a dresser which is adjustable to shape any involute used on grinding wheels within the range of its capacity.

An involute dresser employing steel tapes to guide the diamond is known in the art, but its use has not been wholly satisfactory because of several factors. Among them, the setting of the device is complex and slow and this construction, though theoretically perfect, is difficult to operate at a high level of precision in practice. An important additional object of my invention therefore is to provide an involute dresser which can be rapidly and accurately adjusted by the ordinarily skilled machinist and which will at the same time give extremely precise results.

I am able to accomplish my whole object by the use of a pivoted diamond which turns about a primary pivot to dress an arcuate profile on the grinding wheel for making the first cut on the gear blank. When this first cut has been completed, the resulting tooth profile is checked on an involute checker and the departure from involute profile caused by the arcuate profile originally imparted to the grinding wheel is measured. The surface of a circular cam concentric with the primary pivot is then deformed to cause a cam follower rigidly attached to the diamond holder to withdraw the diamond point inward of the arc which it followed on the first dressing a sufficient amount at the proper place to compensate for the measured amount of departure from involute profile. The profile resulting from the second dressing, in which the diamond is guided by the deformed cam, is a very close approximation of a true involute though never theoretically perfect.

In order to permit the cam follower to cause this change in the path of the diamond as it turns around the primary pivot, it is necessary to have a secondary or pantograph pivot about which there is rotation only because of the deformation in the circular shape of the cam concentric with the primary pivot.

Fine adjustment of the dresser is made by the deformation of the circular cam which is a matter of a few thousandths of an inch at most. Gross adjustments are made through dovetail slides and ways provided with suitable locking gibs and by moving the diamond itself in the diamond holder. Any diameter of grinding wheel within the capacity of the machine is accommodated by moving the dresser in a slide perpendicular to the axis of rotation of the grinding wheel. Any thickness of grinding wheel demanded by the pitch of the gear to be ground is accommodated by adjustment of the dressing head relative to the center line of the grinding wheel face by means of a slide parallel to the axis of rotation of the grinding wheel. The radius of the arc dressed on the wheel for the first cut is determined by adjustment of the diamond in its holder relative to the axis of the primary pivot.

For a complete understanding of my invention attention is invited to the following detailed description of a tool embodying the invention which has been successfully used in precision shop work and which is illustrated in the accompanying drawings, in which:

Fig. 1 is a side elevation of a dresser embodying my invention, with portions of a grinder in connection with which it operates indicated;

Fig. 2 is a front elevation of the same dresser;

Fig. 3 is a plan view of the same dresser partly in section;

Fig. 4 is a side elevation of the same dresser seen from the opposite side from Fig. 1; and Fig. 5 is a diagrammatic illustration on a larger scale of the operation of the deformable cam.

The construction of the dresser is necessarily both massive and precise to afford the requisite precision of movement. It is mounted on the grinder, around the horizontal housing 1 of the spindle 2 by which the grinding wheel 3 is revolved, by means of the clamp 4 which carries the vertical way 5. The arm 6 is mounted in the way 5 by means of the dovetail slide portion 7. It is vertically adjusted by the micrometer screw assembly 8.

At the outer end of the arm 6 is the vertical pivot 9 whose center is directly above the center of the grinding wheel 3. Pivoted on the pivot 9 is the horizontal dovetail way 10 carrying the slide 11, adjustable along it by means of the screw assembly 12. The slide 11 in turn carries the frame 13 which supports the dresser mechanism proper. The dovetail way 10 carries the two stop pins 14 and 15 which limit the swing of the frame 13 about the pivot 9 by contact with the upright pin 16 on the arm 6. This swing is precisely 90° on either side of the axis of the spindle 2 to permit accurate duplication of the profile dressed on both sides of the grinding wheel 3. In describing the operation of my invention, for the sake of simplicity, I will refer only to the dressing of one side of the wheel 3, it being understood that by rotation around the pivot 9 the dressing of the other side of the wheel 3 will be identical.

Between the extensions 17 of the frame 13, the shaft 18 carries the housing 19 precisely journaled thereon by means of ball bearings 20. The pivot about the shaft 18 I will term the secondary pivot.

Below the secondary pivot in the housing 19 is the shaft 21 precisely journaled in the housing 19 by means of the ball bearings 22. This shaft carries at one end the diamond holder 23 and at the other end the arm 24 carrying the cam follower 25. The pivot about the shaft 21 I will term the primary pivot.

The diamond holder 23 maintains the point of the diamond 26 in the plane defined by the axes of rotation of the spindle 2 and the pivot 9. The diamond 26 in the diamond holder 23 and the apex of the cam follower 25 are both in a plane passing through the axis of the primary pivot, but are on opposite sides of that axis, as shown in Figs. 1 and 4. A handle 37 is provided on the cam follower 25 for rotating the shaft 21 during the dressing operation.

On the end of the frame 13 away from the pivot 9 is rigidly mounted the arm 27 carrying thereon the circular cam 28 concentric with the primary pivot. The circular cam 28 is mounted on the end of the arm 27 by means of the bolt 29 which holds it frictionally against the arm 27 and permits rotational adjustment thereof. The cam 28 may be rotated about the bolt 29 to bring the concentric arc slot 30 into a position in which it engages the cam follower 25 during a part of the dressing movement of the diamond 26 about the primary pivot. This slot 30 is adjustable by means of the screw 31 and this adjustment permits the deformation of the circular cam 28.

The function of the bulge resulting from the adjustment of the screw 31 is best understood by reference to Fig. 5 which shows the adjustment of the cam 28 in relation to the wheel profile to be dressed to an involute curve.

When the diamond holder 23 and cam follower 25 are rotated about the primary pivot, the cam follower will be riding the true circular form of the cam from approximately a position in which the diamond 26 is dressing the portion of the grinding face which will cut the profile of the gear teeth 32 at the outside diameter 34 of the gear to the point at which the diamond is dressing the portion of the grinding face which will cut the profile of the teeth 32 at the pitch diameter 35 of the gear. In this portion of the tooth profile the difference between a circular arc and a true involute curve is so small that it does not exceed the manufacturing tolerances of the very finest machine work. However, at that part of the tooth profile which is adjacent the base circle of the gear the departure from the circular arc is greater than these tolerances.

To determine the amount of deformation of the circular cam 28 necessary, it is rotated to a position in which the cam follower 25 can only ride a true circular surface. In this position the face of the grinding wheel is dressed and a complete first cut on the gear wheel is made. The resulting gear wheel has teeth of proper pitch but with a tooth profile which is a circular arc. This roughed-out gear is then checked on a suitable involute checker, and the departure from the true involute curve at the base of the tooth is measured. The measured error is due to excess metal at the base of the teeth. Its magnitude is applied to deforming the circular cam 28 by adjustment of the screw 31. Then, that cam is rotated to the position shown in Fig. 5, in which the measured amount of deformation comes under the cam follower 25 when the diamond 26 is in position to dress that portion of the grinding face which cuts the profile of the tooth where it is adjacent to the base circle of the gear.

The grinding wheel is redressed by rotating the diamond 26 and cam follower 25 about the primary pivot as before. When the cam follower 25 is traveling over the deformed portion 33 of the circular cam 28, the point of the diamond 26 is drawn away or inward of the circular arc leaving a greater amount of material at that part of the grinding wheel 3. In order for the diamond to be able to move thus, a rotation of the housing 19 about the secondary pivot takes place, temporarily destroying the concentricity of the cam 28 and shaft 21.

The gear is then given a second cut with the newly dressed wheel. The wheel so dressed has a greater amount of abrasive material at the point where the diamond was withdrawn, because of the deformation of the circular cam. It will therefore remove the excess material from the teeth of the wheel at that part adjacent the base circle. Because the amount removed adjacent the base circle is equal to the measured error, gears so cut will, when checked on an involute checker, come within manufacturing tolerances for the finest work. This is true of all driving and other gears having a customary pitch. However, certain pump gears having a very small number of teeth for the size of their base circle, may require closer approximation of a true involute than can be accomplished with a single adjustment on the dresser of this invention.

In redressing the wheel, the amount of reduction of its diameter will be measured on the micrometer assembly 8 and a corresponding lowering of the wheel 3 can be made on the grinder so that cutting of the gear wheel can be taken up precisely at the point where it was left off after the first cut for redressing of the wheel.

While I have described my invention with care in terms of an actual machine which has been constructed and successfully employed on extra fine machine work, I do not propose to be limited to the precise form of device discussed. Rather, for a definition of the scope of my invention attention is directed to the appended claims in which, I claim:

1. In an involute dresser, a supporting frame, a housing journaled at one end on said frame, an arm journaled at the other end of said housing with the axes of rotation of said housing and said arm parallel, a diamond point affixed to the inner end of said arm, a cam follower affixed to the outer end of said arm displaced from the axis of rotation of said arm and faced inward toward said axis, a circular cam carried by said frame concentric with the axis of said arm with its perimeter in contact with said cam follower and means for locally deforming the perimeter of said cam.

2. In an involute dresser, a supporting frame, a housing journaled at one end on said frame, an arm journaled at the other end of said housing with the axes of rotation of said housing and said arm parallel, a diamond point carried on the inner end of said arm adjustable in a line perpendicular to the axis of rotation of said arm, a cam follower affixed to the outer end of said arm displaced from the axis of rotation of said arm and faced inward toward said axis, a circular cam carried by said frame concentric with the axis of said arm with its perimeter in contact with said cam follower and means for locally deforming the perimeter of said cam.

3. In an involute dresser, a supporting frame, a housing journaled at one end on said frame, an arm journaled at the other end of said housing with the axes of rotation of said housing and said arm parallel, a diamond point affixed to the inner end of said arm, a cam follower affixed to the outer end of said arm displaced from the axis of rotation of said arm and faced inward toward said axis, a circular cam carried by said frame concentric with the axis of said arm with its perimeter in contact with said cam follower, a segmental slot transversely through said cam close to and concentric with the perimeter thereof and screw means for widening said slot locally.

4. In an involute dresser, a supporting frame, a housing journaled at one end on said frame, an arm journaled at the other end of said housing with the axes of rotation of said housing and said arm parallel, a diamond point affixed to the inner end of said arm, a cam follower affixed to the outer end of said arm in the plane determined by the axis of rotation of said arm and said diamond point on the opposite side of said axis from said point displaced from the axis of rotation of said arm and faced inward toward said axis, a circular cam carried by said frame concentric with the axis of said arm with its perimeter in contact with said cam follower and means for locally deforming the perimeter of said cam.

5. An involute dresser for grinding wheels adapted to be mounted in fixed relation to the wheel to be dressed comprising a supporting frame adjustable both parallel and perpendicular to the axis of rotation of said wheel pivoted about an axis passing through the center of said wheel perpendicular to its axis of rotation, a housing journaled at one end on said frame, an arm journaled at the other end of said housing with the axes of rotation of said housing and said arm parallel, stops for limiting the rotation of said frame about its pivot to 180 degrees whereby the axes of rotation of said housing and said arm will be at either extreme position of said frame perpendicular to the axis of rotation of said wheel, a diamond point carried at the inner end of said arm in the plane determined by the axis of rotation of said wheel and the axis of the pivot of said frame adjustable in a line perpendicular to the axis of rotation of said arm, a cam follower affixed to the outer end of said arm displaced from the axis of rotation of said arm diametrically opposite to said point and faced inward toward said axis, a circular cam carried by said frame concentric with the axis of said arm with its perimeter in contact with said cam follower and means for locally producing a bulge on the perimeter of said cam.

6. An involute dresser according to claim 5 having graduated micrometer screw means for adjusting said supporting frame perpendicular to the axis of rotation of said wheel.

7. In an involute dresser a frame, a rotating spindle for the wheel to be dressed mounted on said frame, a rotatable support for a dressing tool mounted on said frame with its axis of rotation transverse to the axis of rotation of the wheel to be dressed, said dressing tool being movable in a plane transverse to its axis of rotation, and means for shifting said tool in such plane when said tool support is rotated, said means comprising co-operating cam members fixed respectively to the stationary frame and tool support, one of said members having a portion concentric with the axis of rotation of the tool and a portion at an angle to said concentric face, said last named portion being adjustable to vary the extent of its maximum displacement from the concentric portion of said cam member.

JOSEPH J. OSPLACK.